US007141730B1

(12) United States Patent
Wu

(10) Patent No.: US 7,141,730 B1
(45) Date of Patent: Nov. 28, 2006

(54) METHOD OF PRODUCING ELECTRIC GUITAR BODY

(76) Inventor: XiaoChuan Wu, 8Fl, ZhuChi Building, SongShan Road, ShanTou City, GuangDong Prov. (CN)

( * ) Notice: Subject to any disclaimer, the term of this patent is extended or adjusted under 35 U.S.C. 154(b) by 0 days.

(21) Appl. No.: 11/162,787

(22) Filed: Sep. 22, 2005

(51) Int. Cl.
*G01D 3/00* (2006.01)

(52) U.S. Cl. .......................................... 84/291; 84/267

(58) Field of Classification Search .................. 84/290, 84/291, 267

See application file for complete search history.

(56) References Cited

U.S. PATENT DOCUMENTS 6,686,522 B1 * 2/2004 Won et al. .................... 84/291

* cited by examiner

*Primary Examiner*—Kimberly Lockett
(74) *Attorney, Agent, or Firm*—Jen-Feng Lee, Esq.

(57) ABSTRACT

Present invention teaches a method of producing electric guitar body without the costly and time-consuming process of wood-carving or other traditional woodworking technique. By creating the molds and injecting proper materials, present invention also achieves the 3-D artistic rendition of desired shape for an electric guitar body and at reduced weight than solid wood carving guitar body.

2 Claims, 6 Drawing Sheets

METHOD OF PRODUCING ELECTRIC GUITAR BODY

FIELD AND BACKGROUND OF THE INVENTION

The present invention relates generally to a method for producing electric guitar body, enabling the lively creation of artistic 3-D artistic work onto the shape or surface of an electric guitar body, increasing the value of the musical instrument, making the instrument more appealing to young players by its potential for creating unique and cute designs.

Guitars, whether acoustic or electric, have 3 major portions: body, neck and (tuning) head. Strings, on one end, are attached to tuning pegs (on the tuning head), over a "nut" piece, and over the length of the neck, and over a "saddle" piece, and then are attached to the body on the other end.

The big difference between an acoustic guitar and an electric one is that an electric guitar's body is not hollow. An electric guitar does not rely on the acoustic vibration of the hollow chamber to make the sound of the strings (when plucked) audible. Instead, an electric guitar senses the vibration of the strings electronically by a "magnetic pickup" device (mounted on the body, under the strings) to route the sensed signal to an amplifier and speaker.

Traditionally, wood materials are used on acoustic or electric guitar body, with painting and coating added. To create lively rendition of 3-D works on a guitar by the traditional woodworking such as carving, however, is time-consuming and costly. The cost limitation is the reason why most guitar bodies are in the monotone shapes, without too much attractive design, to increase consumer appeals.

Not only is the woodworking time-consuming and costly, the finished body will be relatively heavy and thus not good for younger players, such as teens or pre-teens.

OBJECTS AND SUMMARY OF THE INVENTION

Present invention provides a low-cost and efficient method to produce the electric guitar body that can have 3-D artistic works, such as animal shapes or facial features thereof, or other 3-D creative renditions of artwork. Present invention allows the creation of electric guitar having desired shape that is lighter in weight and thus easier to handle.

Electric guitars made by present invention bear the same handling attribute as the traditional wood-crafted guitar, allowing additional craftsman work such as drilling or nailing, if necessary, yet remain light weight and versatile in terms of the creation of the appearance for 3-D artwork.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

DETAILED DESCRIPTION OF THE PREFERRED EMBODIMENT

Figure 3:
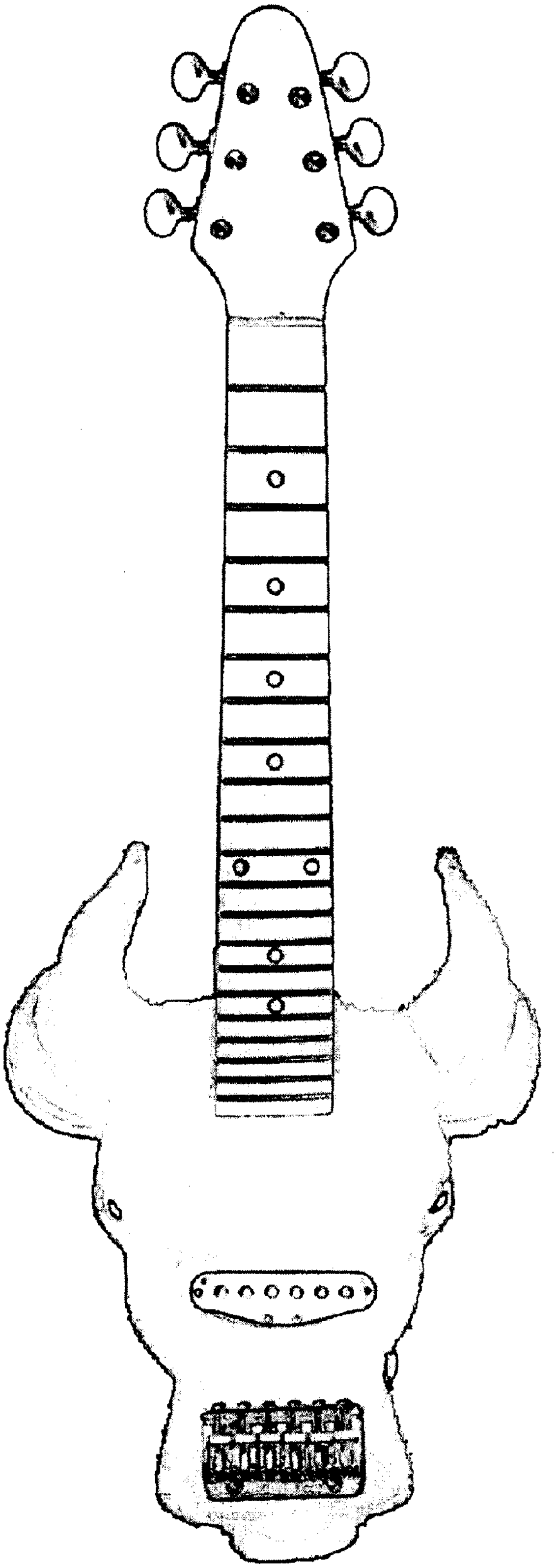
FIG. 3 shows the result of an electric guitar (body) shaped like a bull's head, a form of 3-D artwork implemented by present invention.
Figure 4A:
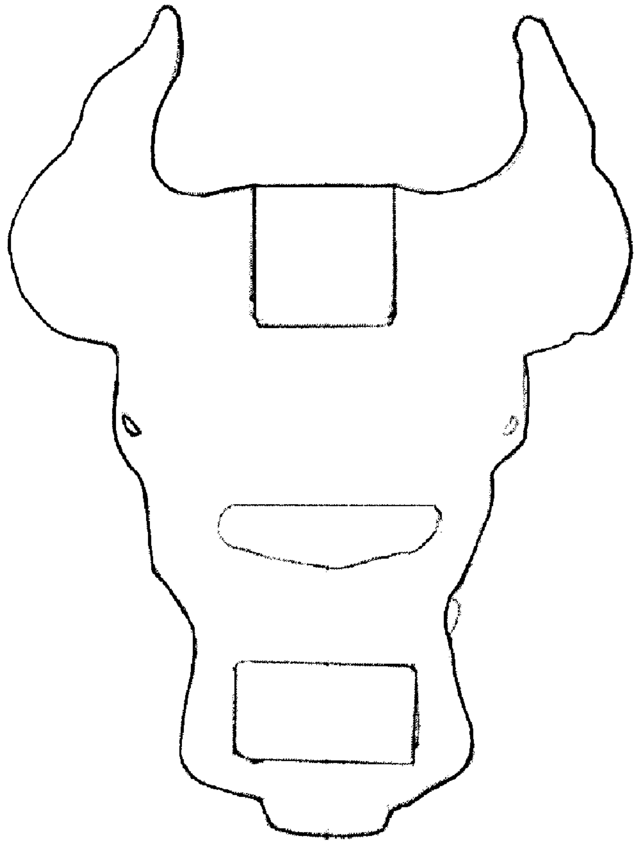
FIG. 4*a* shows the front view of an electric guitar body in the shape of a bull's head.
Figure 4B:
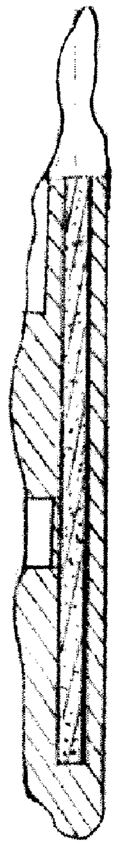
FIG. 4*b* shows the side view of the electric guitar body in the shape of a bull's head.
Figure 5A:
FIG. 5*a*. shows a layer of injected unsaturated polyester resins to the inner surface of the molds.
Figure 5B:
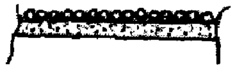
FIG. 5*b* shows a layer of injected fiberglass on top of said resins to the inner surface of the molds.
Figure 6A:
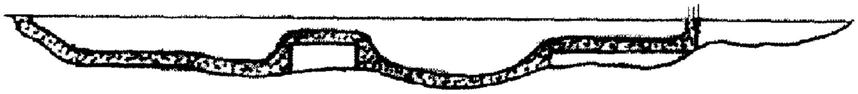
FIG. 6*a* shows the inner surface of first mold containing injected materials.
Figure 6B:
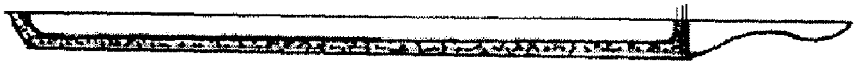
FIG. 6*b* shows the inner surface of second mold containing injected materials.

In accordance with the method of present invention, to create a guitar body of desired shape, such as the face of a Easter bunny or a bull's head, two molds are first made to constitute the outer shells of the desired shape, so that when the two molds are fitted together, the internal space reflects the desired shape of the guitar body. See FIG. 3.

Figure 1:
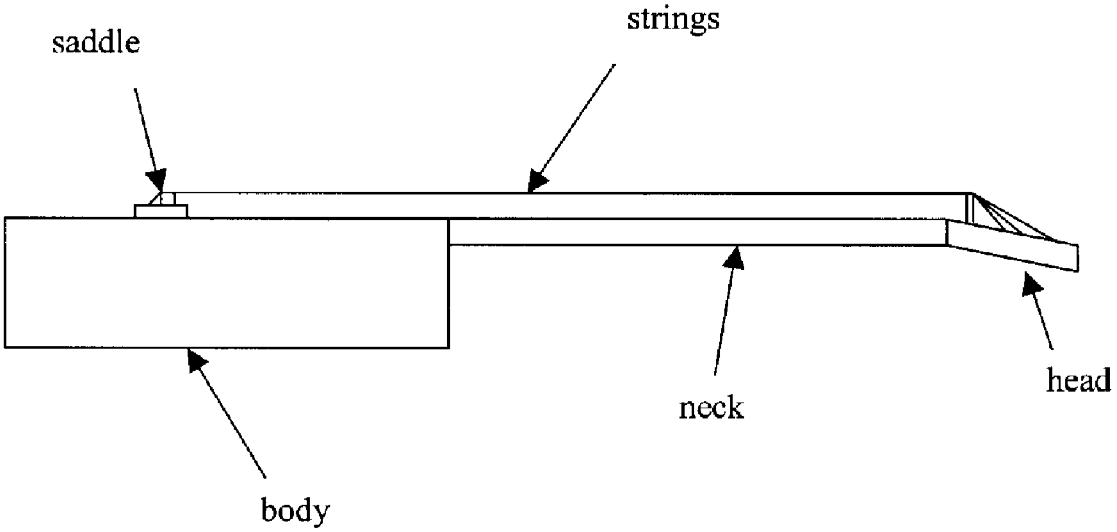
Figure 1 (Prior Art)
FIG. 1 shows a side view for the general shape and composition of a guitar.
Figure 2A:
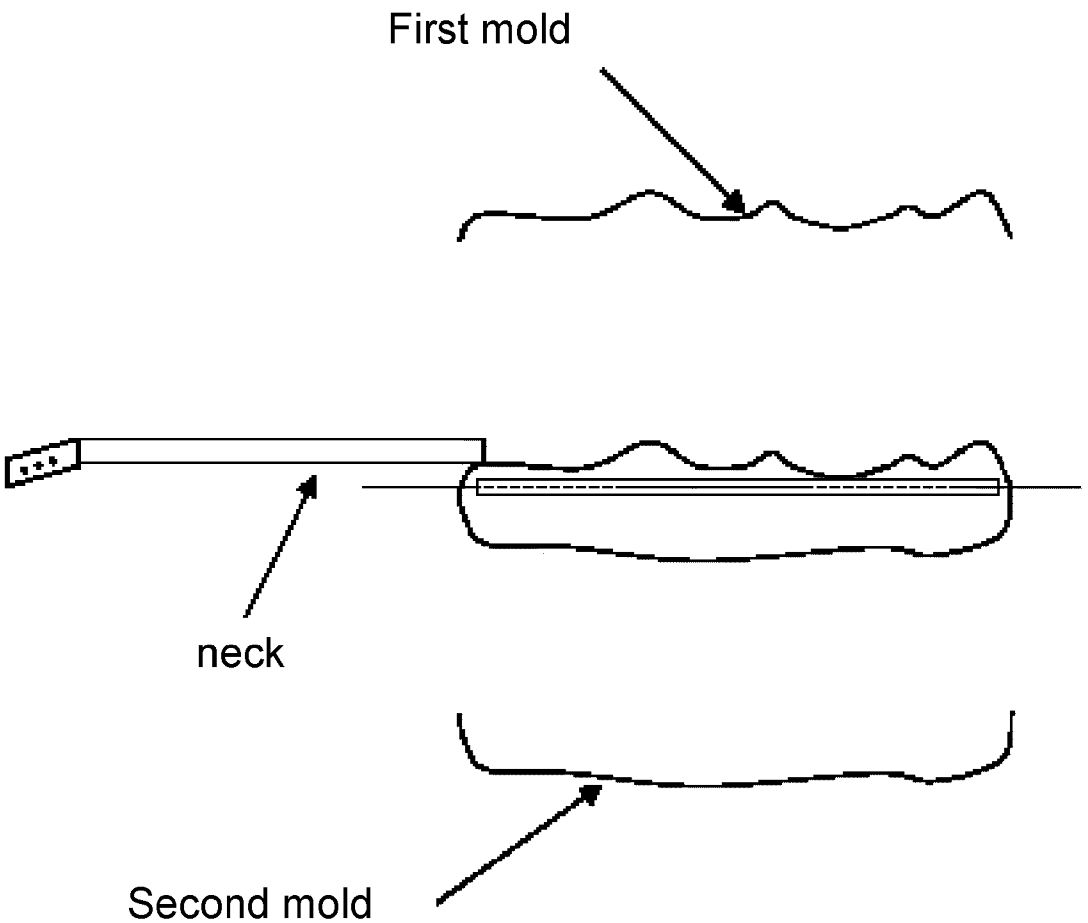
FIG. 2*a* shows the body of an electric guitar of present invention with the two molds shown next to the two halves.

In FIG. 2*a*, the two molds are named First and Second. The sequence of the numbering, however, is not important for purpose of this invention. Reversing the order serves equally for purpose of disclosure or practicing present invention.

Inject unsaturated polyester resins to the two molds.

Figure 2B:
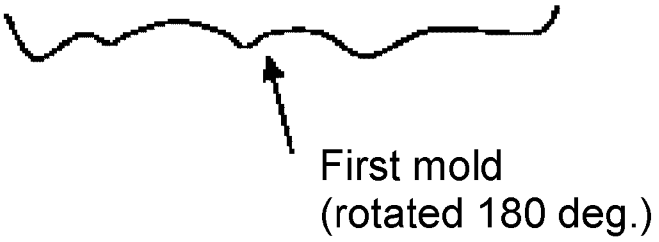
FIG. 2*b* shows the first mold being properly placed to receive all injected materials.

First mold is depicted to show the shape of the upper half of an electric guitar pursuant to present invention. First mold has to be rotated 180 degrees, naturally, so that it can contain all the needed materials and work properly, as shown in FIG. 2*b*.

Then introduce a layer of fiberglass material into the two respective molds containing unsaturated polyester resins previously injected.

The process of injecting unsaturated polyester resins and layer of fiberglass can be repeated one more time but not more than ten times, depending on specific machinery or difference in material strength.

Figure 7A:
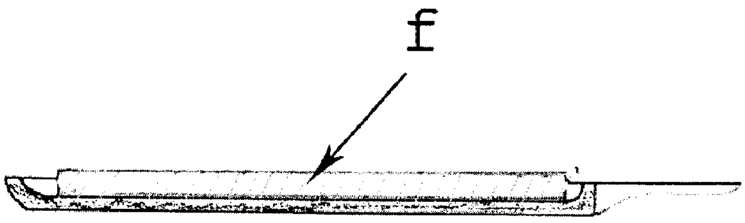
FIG. 7*a* shows a reinforcement wood piece is added to the room in between the two molds (second mold shown).

Add reinforcement wood pieces into the two respective molds, to provide structure strength, as shown by arrow f in FIG. 7*a*.

Figure 7B:
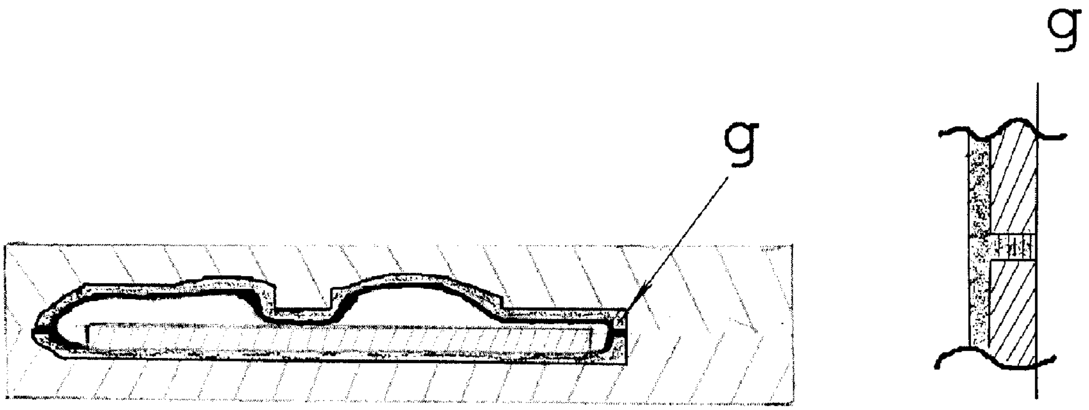
FIG. 7*b* shows heated unsaturated polyester resins were injected to the joints in between two molds. Fig. g shows the enlarged view of the joints portion.

Put the two molds together, and inject heated unsaturated polyester resins to the joints connecting the two halves, as shown in FIG. 7*b*. The Fig. g shows the enlarged view of the joints having heated unsaturated polyester resins filled in.

Gently rotate the two molds to cause the resins to be filled in evenly.

Draw out and remove the excessive resins extruding out from the joints.

Figure 7C:
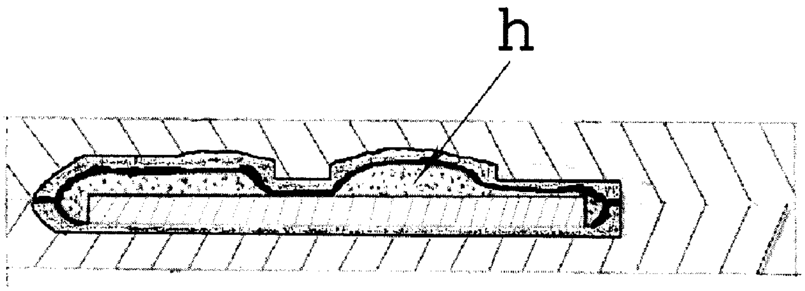
FIG. 7*c* shows the injection of flexible polyester polyurethane foamed plastics (arrow h) to the remaining room inside the two shells after the two shells are integrated together.

Inject flexible polyester polyurethane foamed plastics (arrow h in FIG. 7*c*) to fill up the room inside the two respective molds.

Finally, secure the two molds together, for the materials inside to cure and form the guitar body of the desired shape.

The finished body can then be further polished and painted, in accordance with the desired color choices of the designer, to make the 3-D guitar body more attractive.

What is claimed is:

1. A method of producing electric guitar body, comprising:

a. Creating a first mold for half of the desired shape of a guitar body;

b. Creating a second mold for the other half of the desired shape of a guitar body;

c. Injecting unsaturated polyester resins into the two respective molds;

d. Introducing a layer of fiberglass material into the two respective molds;

e. Administering the injection of polyester resins and fiberglass for a total of one to ten times;

f. Adding reinforcement wood pieces into the space between the two respect molds when putting the tow molds together;

g. Injecting heated unsaturated polyester resins to the joints between the two molds;

h. Relatively rotating the two molds to cause the resins to be filled in between the joints evenly;

i. Drawing out the excessive resins extruding out from the joints between the two molds;

j. Injecting flexible polyester polyurethane foamed plastics to the inner space as defined by the two molds; and k. Securing the two molds together for all the materials inside to cure and form a guitar of desired shape.

2. The method of claim 1, further comprising:

Polishing the finished body of desired shape and adding exterior paint of selected colors.

* * * * *